Patented Mar. 4, 1930

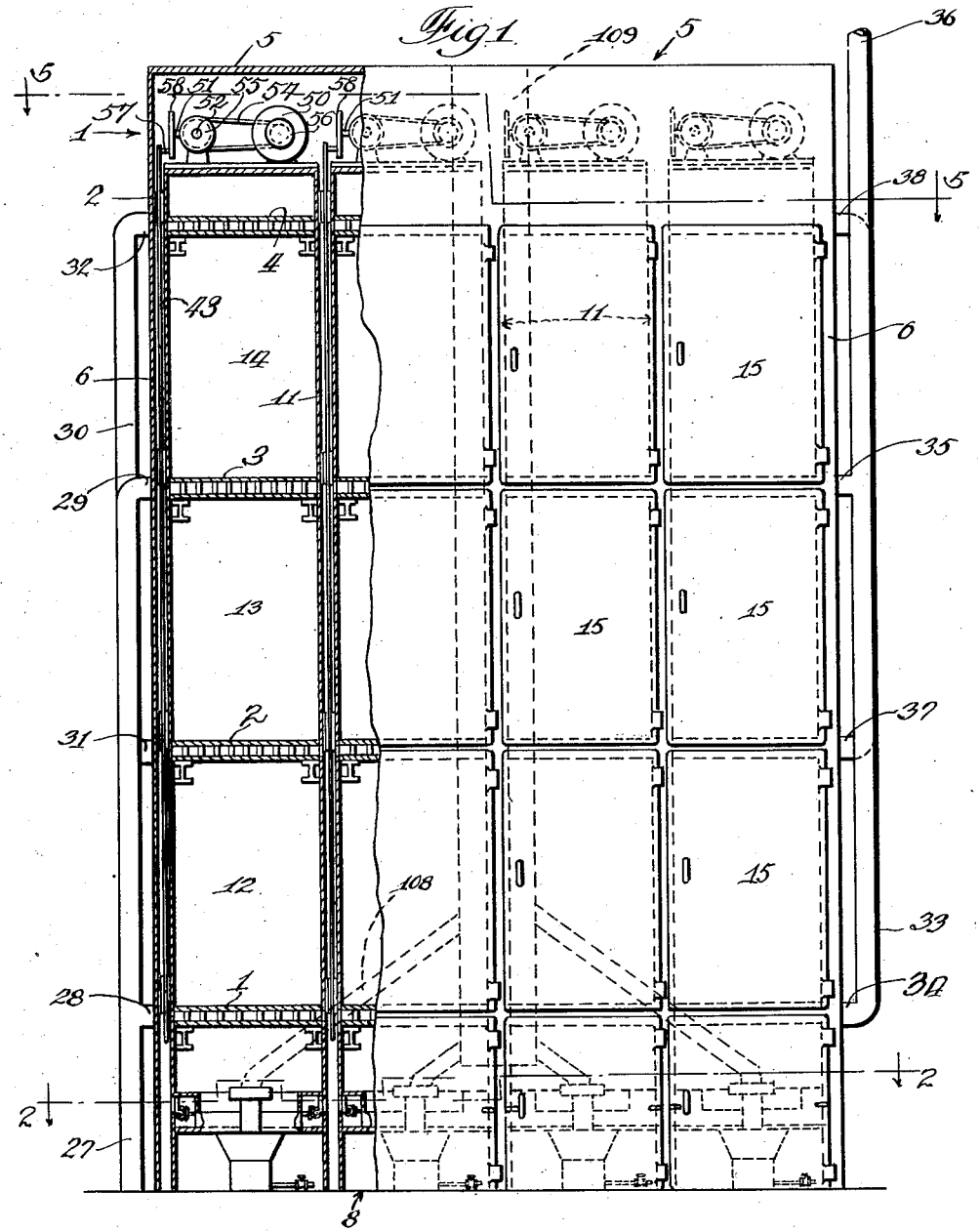

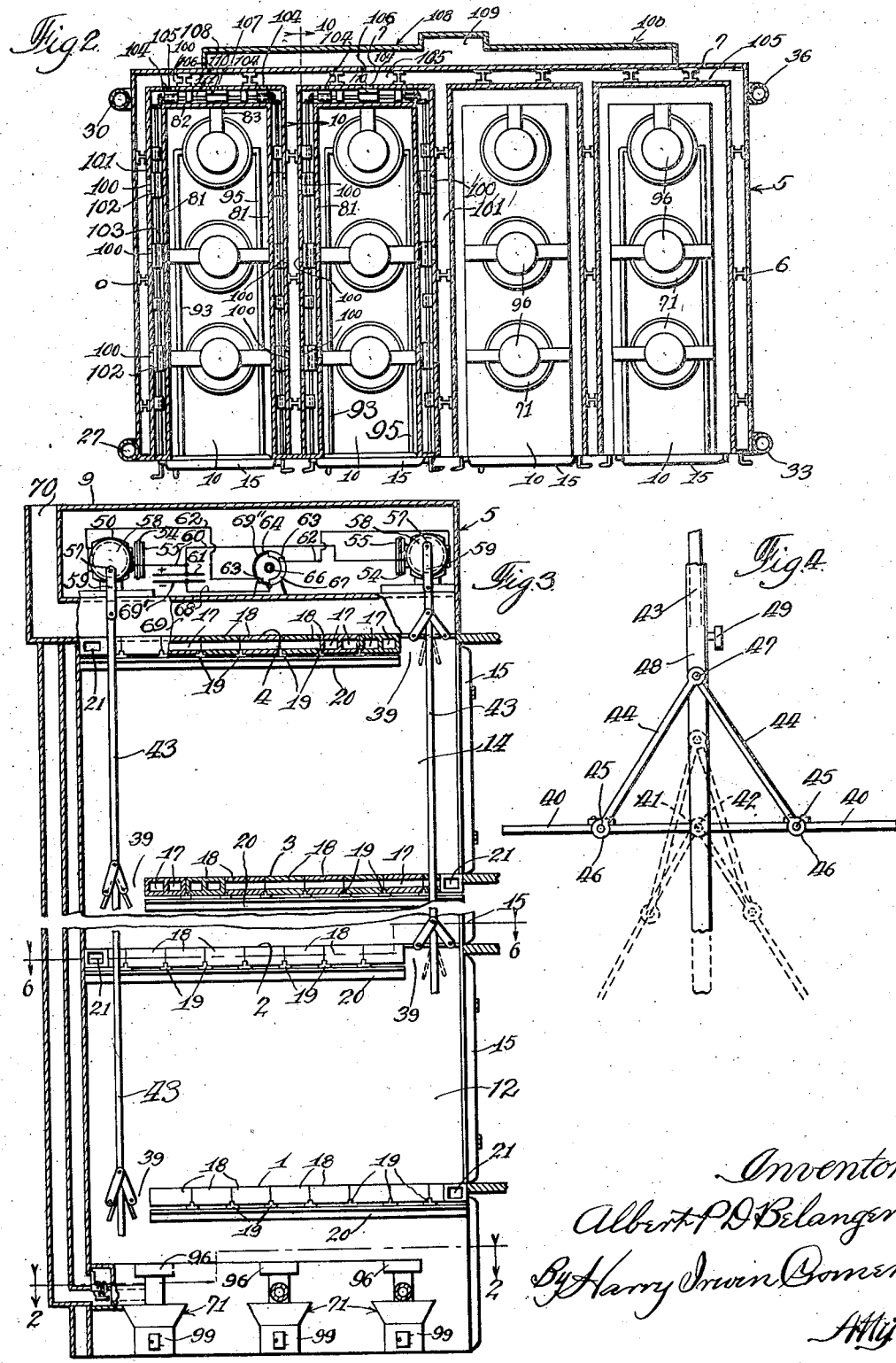

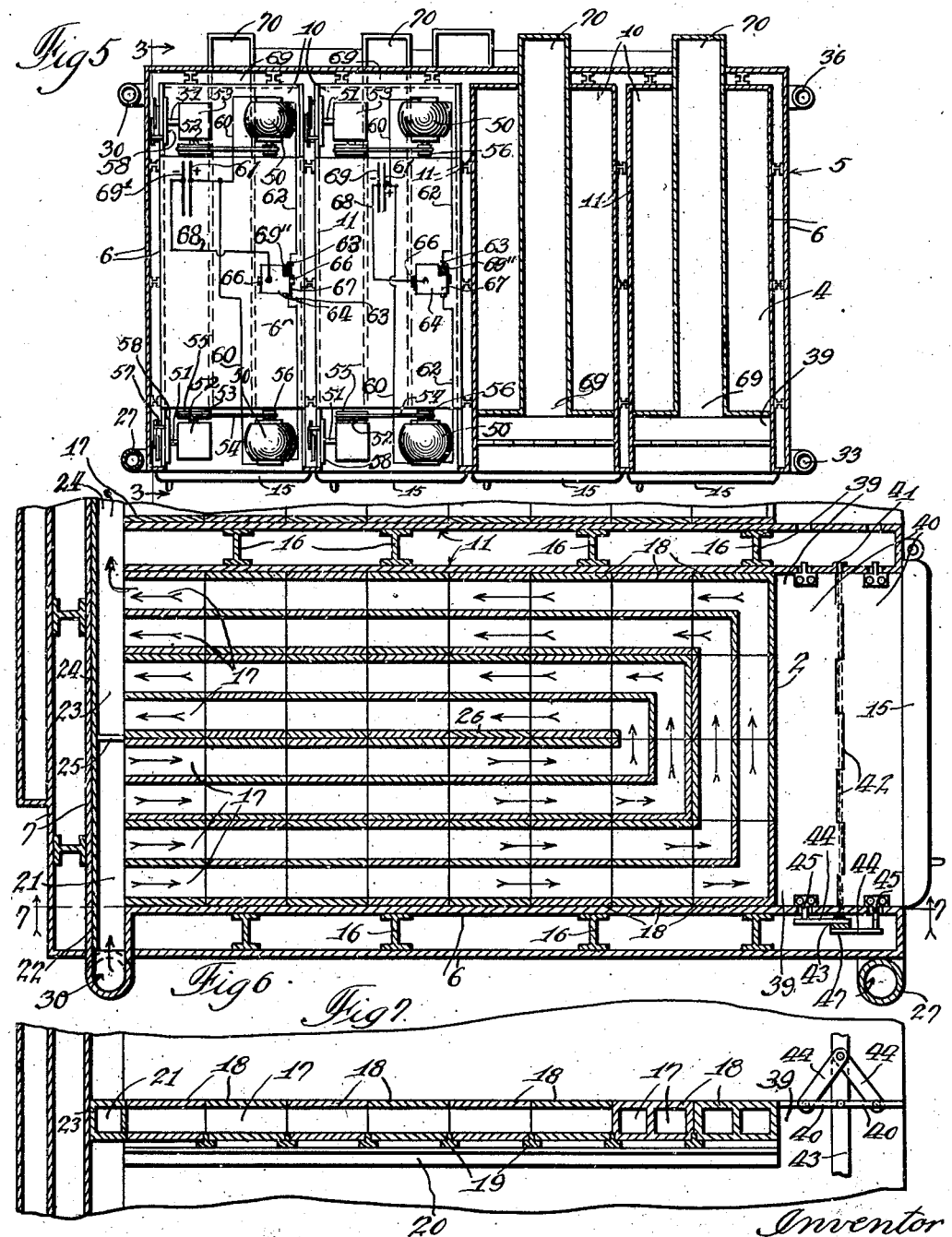

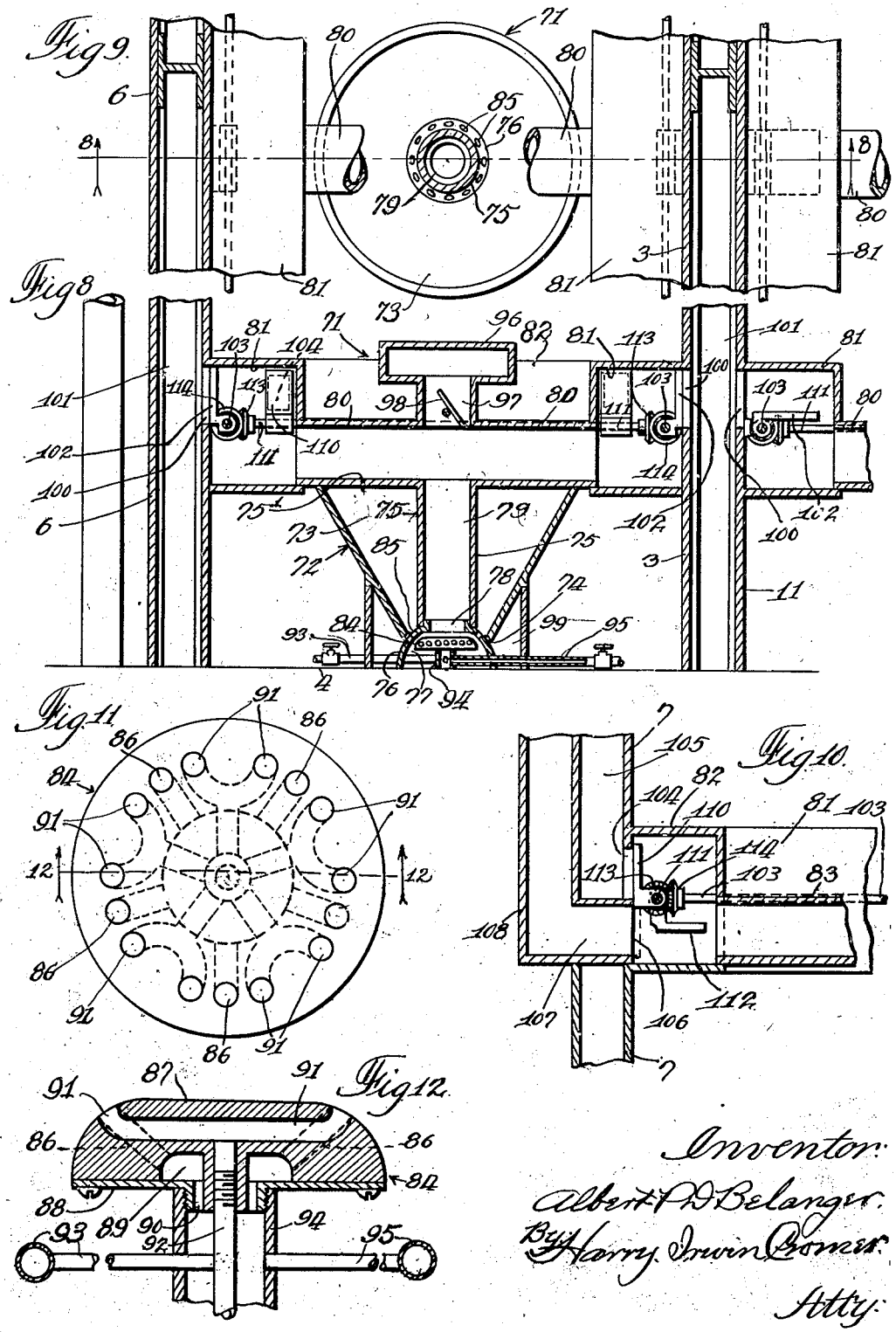
March 4, 1930. A. P. D. BELANGER 1,749,559
APPARATUS FOR SMOKING, CURING, AND DRYING FOOD PRODUCTS AND THE LIKE
Filed June 15, 1928 4 Sheets-Sheet 4

1,749,559

UNITED STATES PATENT OFFICE

ALBERT P. D. BELANGER, OF CHICAGO, ILLINOIS, ASSIGNOR TO REYNOLDS ELECTRIC COMPANY, OF CHICAGO, ILLINOIS, A CORPORATION OF ILLINOIS

APPARATUS FOR SMOKING, CURING, AND DRYING FOOD PRODUCTS AND THE LIKE

Application filed June 15, 1928. Serial No. 285,574.

This invention relates to that class of mechanisms or apparatus for smoking and curing or drying food products and similar materials or articles, comprising a structure provided with any desired number of suitable compartments for containing the material to be operated upon, and provided with means for producing and controlling the admission of smoke-laden air into the compartments containing the products to be treated, and means for retaining the smoke-laden air in the compartment or compartments for the desired period or periods of time, and for permitting and causing the circulation of the same through the compartment or compartments and controlling its escape therefrom in the operation of treating the material to be operated upon.

The principal object of the invention is to provide a simple, economical and efficient mechanism or apparatus for smoking and curing or drying food products or similar articles or materials.

Other and further objects of the invention will appear from the following description and claims, and from inspection of the accompanying drawings, which are made a part hereof.

The invention consists in the features, combinations, and details of construction and arrangements of parts herein described and claimed.

In the accompanying drawings:

Figure 1 is a view in front elevation of an apparatus or structure provided with a multiplicity of compartments, and having a series of burners and valve-controlled passages for producing and controlling the condition of the smoke-laden air to be admitted to and allowed to escape from such compartments, constructed and adapted to operate in accordance with my invention;

Fig. 2 is a plan view of the structure and mechanism or apparatus shown in Fig. 1, with parts of the covering broken away, and parts of the structure shown in horizontal section, as it would appear taken on line 2—2 of Fig. 1, and showing a top view of the burners, and the damper-controlled passages communicating with the burners;

Fig. 3 is a view in transverse sectional elevation taken on line 3—3 of Fig. 2 looking in the direction indicated by the arrows, with parts broken away and other parts omitted;

Fig. 4 is an enlarged detail view of one of the automatically operated pairs of trapdoors for controlling the passage of smoke-laden or prepared air from compartment to compartment;

Fig. 5 is a view in horizontal section taken approximately on irregular line 5—5 of Fig. 1 and showing the upper floor of the structure and the means for operating the trapdoors or valves for controlling the passage of air and smoke through the compartments containing the materials to be treated;

Fig. 6 is an enlarged detail view in horizontal section taken on line 6—6 of Fig. 3 looking downward, as indicated by the arrows, and showing the hollow construction of the compartment floor and the passages connecting the interiors of the floors and hollow upright walls of the structure;

Fig. 7 is a view in vertical section taken on line 7—7 of Fig. 6 looking in the direction indicated by the arrows;

Fig. 8 is an enlarged detail view in vertical section taken through the center of one of the burners and showing the damper-controlled passages leading from the burners and into and through the upright hollow walls of the structure;

Fig. 9 is a plan view in detail of the burner shown in Fig. 8 with parts broken away, and with the upright hollow walls shown in horizontal section;

Fig. 10 is an enlarged detail view in section taken on line 10—10 of Fig. 2 showing the damper-controlled passages which communicate with the burners and permit the heated air from the burners to be discharged through the hollow walls and connected floor spaces, or discharged without passing through the hollow walls and floor spaces, as desired;

Fig. 11 is an enlarged plan view in detail of the burner shown in Figs. 8 and 9; and Fig. 12 is a view in vertical section taken on line 12—12 of Fig. 11, looking in the direction indicated by the arrows.

In constructing an improved apparatus or mechanism for smoking, curing, drying and treating food products or other materials in accordance with my invention, I provide a structure which is, by preference in the form of a building having upright outer walls, inner walls or partitions and suitable floors or ceilings forming any desired number of compartments.

The space enclosed within the outer walls is by preference, divided into vertical sections by the inner walls or partitions; and the vertical sections are divided into any desired number of superposed compartments by suitable floors which are, by preference hollow, each floor having a door-controlled opening or passage which is adapted to connect the compartment immediately below such floor with the next compartment above, for permitting the passage of smoke-laden air or prepared air into the superposed compartments successively, confining it in and retarding its passage through the respective compartments when and for such periods as may be desired, for treating the materials contained in such compartments, and releasing and permitting the prepared or smoke-laden air to pass freely through the door-controlled openings from compartment to compartment after subjecting the materials to be treated to the action of said prepared or smoke-laden air, which is finally permitted to escape.

Means is also provided for preparing and supplying the treated or smoke-laden air for treating the food products or other material to be smoked, cured, dried, or otherwise treated in the various chambers or compartments, and for controlling the supply of treated or smoke-laden air to the compartments and the duration of the periods of time in which it is to be retained or allowed to remain in the respective compartments in which the material is to be treated.

A very desirable form of my improved apparatus or mechanism constructed in accordance with and embodying my invention, is illustrated diagrammatically in the accompanying drawings, and comprises a structure or building 5 having outer upright side or end walls 6, 6, a back wall 7, a bottom floor 8, and a roof or cover 9 enclosing a space which is, by preference, divided into a plurality of vertical sections by parallel upright partitions or inner walls 11, each of said sections being, by preference, divided into a series of superposed compartments 12, 13, 14, by suitable floors 1, 2, 3, and 4, of which there may, of course, be any desired number. The front side of the structure may consist of or comprise a series of hinged or otherwise movable doors 15 which open into the superposed compartments, for admitting and permitting the removal of material to be smoked, cured, dried or treated.

The upright walls 6, 6, 7 and 11, are, by preference, hollow and provided with upright studding which may be in the form of upright metal beams 16 having spaces therebetween which are open from the bottom to the top of the wall or structure of which they form a part.

The spaces between the upright studding within the hollow upright walls, or any suitable number of said spaces, may be employed as flues or conduits leading upward within the hollow walls; and the floors 1, 2, 3, 4 or any desired one or more of said floors, may be and, by preference, are of hollow construction, and are provided with or adapted to form air passages 17 within such hollow floors and which are connected or adapted to communicate with air-inlet and outlet passages or flues.

In the structure shown in the drawings, the floors 1, 2, 3 and 4, are made of hollow tiles 18 laid end to end upon transverse angle irons or T-irons 19 which are supported at their opposite ends upon longitudinal floor members or joists 20, which may be in the form of angle irons secured to and supported by the upright walls 6 and 11 and the upright studding with said walls. (See Figs. 3, 6 and 7.)

Each of the hollow floors 1, 2, 3 and 4, is, by preference, provided at one end with an inlet passage or manifold 21 which may be formed of a split hollow tile 22, and communicates with and forms a connection between the inlet ends of corresponding inner passages 17 in such hollow floor. And a similar outlet passage or manifold 23 is formed, by preference, at the same end of the hollow floor by a similar longitudinally split hollow tile 24, and forms a connection between the adjacent discharge ends of the said passages 17. There is a central partition wall 25 between the inlet and outlet manifolds or passages 21 and 23, and a central partition 26 between the parallel longitudinal receiving and outlet portions of the passages 17. The passages 17 thus extend around and transversely across one end of the central partition 26, and form conduits which are adapted to receive and conduct heated air or steam or cold air through said passages from the receiving manifold 21 around the end of the central partition 26 to the discharge passage or manifold 23, for heating or cooling or regulating the temperature within the hollow floors.

An upright supply pipe or conduit 27 is provided and connected with the inlet passages or manifolds 21 of alternate floors 1 and 3 by horizontal or branch passages 28 and 29; and a similar upright supply pipe or conduit 30 is connected with the inlet passages or manifolds 21 of the end floor sections of alternate floors 2 and 4 through the same upright end wall 6 at the same end of the structure. (See Figs. 1, 2, 5 and 6.)

An upright discharge pipe or flue 33, located on the outside of the opposite upright end wall 6, is connected with the adjacent outlet passages or manifolds 23 of alternate floors 1 and 3 by horizontal or branch passages 34 and 35 which extend through the upright end wall 6 at the opposite end of the building from the supply pipes above described; and a similar upright discharge pipe or flue 36 is connected with the outlet passages or manifolds 23 of the adjacent floor sections of alternate hollow floors 2 and 4 respectively, by means of horizontal branch pipes or discharge passages 37 and 38 which extend through the upright wall 6 adjacent to said discharge pipe or flue 36. (See Figs. 1, 2 and 3.)

The sinuous passages 17 of all of the floor sections of each floor respectively, are connected, so as to form a continuous passage leading from an upright supply pipe to a corresponding upright discharge pipe or flue 33 or 36 as the case may be, each discharge passage or manifold 23 being connected with an adjacent inlet passage or manifold 21 of the next adjacent floor section of the same floor, so as to form a connected sinuous passage through all of the passages 17 of all of the hollow floor sections of each floor respectively from supply pipe to discharge flue. (See Figs. 1, 2, 3, 5, 6 and 7.)

The floors 1, 2, 3 and 4, are by preference, of substantially identical construction, except that floors of alternate superposed compartments—for example, floors 1 and 3—have their ends reversed relatively to the intermediate or alternate floors—for example floors 2 and 4—of the other alternate superposed compartments, so that the inlet and outlet passages or manifolds 21 and 23 of the floor sections constituting floors 1 and 3 are located adjacent to the back upright wall 7 of the structure, and the inlet and outlet passages or manifolds 21 and 23 of the floor sections constituting floors 2 and 4 are adjacent to the front or door-enclosed side of the structure and to the doors 15 leading into the compartments 10 for receiving the materials to be treated. (See Figs. 3, 6 and 7.)

Each of the floors 1, 2, 3 and 4, respectively, is thus divided into a series of floor sections, one for each vertical section 10, there being as many floors and as many sections in each floor as may be required; and each floor section has a door-controlled opening 39 at or near one end thereof adapted to communicate with and to form a connection between the compartments immediately above and below such floors respectively. The openings or door-controlled passages 39 in the floors are, by preference, located at the opposite ends of the respective floor sections from the inlet and outlet passages or manifolds 21 and 23 already described, as best shown in Fig. 3. The superposed compartments 12, 13 and 14 are thus provided with connecting door-controlled passages or openings 39 which are, by preference in staggered relation, the said door-controlled openings in alternate floors—for example, floors 1 and 3,—being directly over each other or at the ends of the compartments adjacent to the back wall 7 of the structure; and the door-controlled openings or passages 39 in the other alternate floors—for example, floors 2 and 4—being directly over each other at the ends of the compartments which are farthest from the back wall 7 of the structure and nearest to the doors 15 and front of the structure. (See Figs. 3, 6 and 7.) Each compartment 12, 13 or 14, as the case may be, thus has a lower door-controlled opening 39 at one end thereof leading in from the next lower compartment, and an upper door-controlled opening 39 leading into the next compartment above and forming the inlet opening for the latter.

By thus arranging the door-controlled openings 39 leading into and from the superposed compartments in staggered relation, so that the lower inlet passage and the upper outlet passage of each compartment are at opposite ends of such compartment, prepared or smoke-laden air may be introduced into the lower compartments 12 at one end thereof, by opening the lower door-controlled passages 39 leading into said compartments respectively, while the door-controlled passages at the opposite ends of said compartments are closed, thus causing the air or air and smoke to remain in said compartments 12 for a desired or predetermined period of time. The passages 39 at the opposite ends of said compartments may then be opened, thus causing the prepared air or air and smoke to pass upward from the compartments 12 into the compartments 13 while the upper door-controlled passages leading from the latter are closed, to be retarded and retained in said compartments 13 for a desired predetermined period of time. And the upper passages 39 leading upward from the compartments 13 may then be opened, thus causing the air or air and smoke to pass upward into the compartments 14 from the compartments 13, to be retarded and retained in the compartments 14 for a desired or predetermined period of time, and so on indefinitely, through as many superposed compartments as may be found necessary or desirable.

Each of the openings or passages 39 is therefore provided with suitable means for opening and closing or controlling the same, which means is, by preference, in the form of a trap door or doors 40 adapted to open and close the respective passages in the desired order. And means is provided for operating the doors automatically in any desired predetermined order, and so that the passages controlled thereby may be opened in predetermined order, caused to remain open for a desired predetermined period of time, and closed and caused to remain closed for any desired predetermined period of time.

It is also desirable that the means for operating the trap doors should include means for operating the doors of the compartments of each of the vertical sections 10 without interfering with the operation of those of any of the other sections so that the admission of the smoke-laden air and its passage through the compartments of each vertical section may be automatically controlled with respect to and independently of those of all of the other sections, to control or vary the treatment of the materials contained in the various sections as required.

A very simple and efficient form of passage-controlling mechanism is shown in the accompanying drawings, in which each connecting passage 39 is provided with a pair of hinged trap doors 40 each supported on and adapted to swing upon a horizontal axis formed by a horizontal door-supporting rod 41 by means of loops or metallic hinge members 42 fixed to the adjacent side margins of each pair of doors and having openings in said hinge members or leaves through which the horizontal door-supporting rod extends from one side to the other of the opening 39 in which the doors are located. (See Figs. 3, 4 and 6; also Fig. 7.)

Each door 40 is operatively connected with an upwardly and downwardly movable vertical door-operating and connecting rod 43 located adjacent to one end of each pair of doors, by suitable connecting means, such for example, as a connecting rod or link 44 the lower end of which is connected with the end of the door by means of an endwise projecting pin or boss 45 fixed to the end margin of the door and extending into an opening or eye 46 in the bottom end of said rod. The upper end of each rod is connected with the corresponding vertical door-operating rod 43 by means of a horizontal pin or boss 47 which is supported on the vertical rod 43 and extends into and in supporting engagement with the perforated upper end of such connecting rod or link 44.

The upper ends of the connecting rods or links 44 may be adjustably connected with the upright supporting rod 43 by means of a hollow sleeve 48 slidably mounted on said upright rod, the pins 47 being fixed to and adapted to project outward horizontally from said sleeve on opposite sides of the sleeve and said upright rod, the sleeve being adjustably secured in releasable engagement with the upright rod by means of a set screw 49, or by other equivalent securing means.

Each upright door-supporting and operating rod 43 is, by preference, mounted within the space within the hollow wall or partition adjacent to the ends of the doors to be supported and operated by such rod, and extends upward and downward through the floors of the several superposed compartments in each of the sections or vertical sets of compartments respectively, and is operatively connected with the several pairs of trap doors 40 located at the corresponding ends of such superposed compartments, each of said upright rods being connected with the trap doors of alternate superposed compartments. The upright door-operating rod 43 at the front ends of the compartments 12, 13 and 14, may be connected with the trap doors in alternate floors 1 and 3; and the upright door-operating rod 43 at the other end of said superposed compartments may be connected with the trap doors 40 of alternate floors 2 and 4. (See Figs. 3 and 6.)

There is, by preference, a pair of these upright door-operating rods 43 and a set of alternately arranged trap-doors operatively connected with and adapted to be operated by each of said pair of upright rods, for each set of superposed compartments, there being one set of such compartments in each vertical section 10, one of said rods being connected with and adapted to operate the trap doors located at one end of said set of superposed compartments, and the other rod being connected with and adapted to operate the trap doors located at the other end of the same set of superposed compartments.

Power-driven means for automatically operating the vertical door-operating rods 43, and the doors connected therewith and located at the opposite ends of each set of superposed compartments in alternate relation to each other, or in the desired predetermined order, is provided and operatively connected with said upright rods and said doors, as follows:

Each of said upright door-operating rods 43 is, by preference, connected with an electric motor 50, of which there may be any desired number. I prefer to employ one motor for each of said upright door-operating rods, the motors being mounted above the compartments 14 and floor 4, and each of said upright rods being connected with the motor for driving it, by suitable connecting gears and crank-shaft mechanism which, in the device shown in the accompanying drawings, consists of or comprises a crank shaft 51 connected with a belt-driven shaft 52 by means of suitable gears—not shown—which may be of any desired, ordinary and well-known form, said gears being enclosed within a gear box 53, the shaft 52 being operatively connected with the motor by means of a belt 54 mounted on a belt pulley 55 fixed to the shaft 52 and a belt pulley 56 fixed to the motor shaft. The crank shaft 51 is operatively connected with the corresponding upright door-operating rod 43 by means of a crank-pin 57 on a crank member 58 on said shaft, and a connecting link 59 pivotally connected with the upper end of the upright rod 43, and provided with an opening in the upper end of said link into which the crank-pin 57 extends. (See Figs. 1, 3, and 5.)

The motors 50 are, by preference, adapted to be operated intermittently and in synchronized relation, and are each connected with a source of electric supply and with means for controlling and synchronizing the operations thereof which may be of any well-known or suitable form:

For example, one pole of each of said motors is connected by a feed wire 60, with a positive circuit line 61 leading to a generator or source of electric supply—not shown. The opposite pole of each of said motors, respectively, is connected by a wire 62 and brush 63 with a power-driven circuit-controller or timing device having a rotative contactor-supporting member or drum 64 of electrically conductive material, fixed to a rotative driven shaft 66 journaled in a suitable support and operatively connected with a motor or other source of power. The drum is insulated from its support and provided with a segmental peripheral contactor 67 thereon adapted to be rotated with the shaft and drum into and out of electrical contact with the respective brushes 63 intermittently or alternately in predetermined order. The electrically conductive body of the drum or contactor-supporting member 64 is connected by a return wire 68 with the negative circuit line 69' or opposite pole of the source of electric supply with which the feed wires 61 of the respective motors are connected.

A segmental peripheral insulation 69" which extends part-way around the contactor-supporting member between the ends of the segmental contactor 67 breaks the motor circuits alternately and serves to hold the brushes 63 out of contact with the contactor-support when the brushes are not in contact with the segmental contactor 67.

From the foregoing it will be readily understood that each floor has its door-controlled passage 39 and automatically operated trap-doors 40 at one end thereof, and the inlet and outlet passages 21 and 23 at the opposite end of such floor. And the door-controlled passages 39 of alternate floors—for example, floors 1 and 3—are directly over each other, while the passages 39 of the other alternate floors—for example, floors 2 and 4—are directly over each other but are located at the opposite ends of the compartments from passages 39 of floors 1 and 3. (See Figs. 1, 3, 6 and 7.)

Prepared or smoke-laden air admitted through the lowermost passage 39 of any lower compartment 12 will thus be caused to pass from end to end of such compartment and into the next higher compartment 13 at its opposite end, then through compartment 13 to its opposite end and upward into the next higher compartment 14, and from end to end of the latter and upward through the uppermost door-controlled passage 39 into and through a discharge passage 69 above the top floor 4 and out through a flue or chimney 70, of which there may be one for each section 10 or series of superposed compartments. (See Figs. 3 and 5.)

The operation of the trap-doors 40 of floors 1 and 3 is so timed with respect to the doors 40 for controlling the passages 39 of the other alternate floors—for example, floors 2 and 4—that the prepared or smoke-laden air is retarded or retained in each compartment for any desired predetermined period of time before being released and permitted to pass upward into the next adjacent or higher compartment, thus subjecting the material in each compartment to the action of the prepared or smoke-laden air for the desired period of time, the periods of time for the respective compartments being determined and controlled automatically by the automatically operated door-actuating mechanism.

My improved apparatus thus comprises or includes means for introducing a current of prepared or smoke-laden air into each treating chamber intermittently, and alternately maintaining the body of prepared or smoke-laden air at rest in such chamber.

The articles to be cured, smoked or dried or treated in accordance with my invention are thus subjected to the action of an intermittently moving current of prepared air or smoke-laden air and alternately to a body of such prepared or smoke-laden air at rest and in contact with such articles. The articles to be treated are thus dried or cured uniformly throughout their mass, and progressively from their centers to their outer surfaces, the moisture or such portions of the moisture sought to be removed being removed in substantially uniform proportions throughout the mass, by being progressively removed or caused to move from the center to the outside surface of the article, partly by capillary attraction, while the articles are surrounded by the prepared or smoke-laden air or smoke at the desired temperature, which may be predetermined and controlled according to the character of the articles to be treated and the kind of treatment to which they are to be subjected. This movement of the moisture from the center to the outside of the articles is caused to take place, by preference, while the articles are surrounded by and in contact with prepared air or smoke-laden air, or smoke or other gaseous material or mixture at rest or comparatively at rest or moving very slowly if at all. The moisture having been permitted to move to the surface of the articles in the manner and under the desired conditions, or as described, they are then subjected intermittently to a current of prepared or smoke-laden air or gaseous material or mixture which causes the moisture accumulated on the outer surfaces of the articles to be absorbed and carried away to the desired extent without causing any undue hardening of the articles at or near the surface relatively to the inside.

Means is provided for preparing the air or gaseous mixture or material to the action of which the articles to be treated are subjected in accordance with my invention.

In the form of apparatus shown in the accompanying drawings smoke-producing means is provided, for supplying a suitable smudge or mixture of air and smoke, or other suitable mixture, and may be constructed as follows:

Each section 10 of superposed compartments or treating chambers 12, 13 and 14, is, by preference, provided with a smoke-producing device 71 which comprises a hopper-shaped receptacle 72 which is, by preference, truncated-cone shaped and has downwardly and inwardly inclined walls forming a truncated-cone shaped smoke-producing chamber 73, said receptacle and chamber having a bottom annular opening 74, and being open at the top as at 75'. The top opening 75' thus serves as an inlet opening, for receiving combustible material, such, for example, as wood shavings, or shavings and saw-dust, or other suitable material, to be burned or caused to smolder within said chamber 73, for the purpose of producing smoke or prepared or smoke-laden air to be introduced into and used in the treating chambers which are, by preference superposed relatively to each other and located directly over the smoke-producing device. (See Figs. 1, 3 and 8 to 12 inclusive.)

A central upright flue 75, which may be in the form of an upright cylindrical pipe or tube of sheet metal, extends vertically through the center of the annular smoke-forming chamber or combustion chamber 73 which thus surrounds said flue. The open bottom end of the pipe or tube rests upon a hollow annular base 76 which, by preference, extends through the opening 74 and forms a burner chamber 77 having an upper central outlet opening 78 which communicates with the outlet passage 79 formed by the upright walls of the flue 75. The bottom burner chamber 77, outlet 78 and passage 79 of the flue thus form a continuous vertical passage which leads upwardly through the center of the bottom annular discharge opening 74 through the center of the annular combustion or smoke-producing chamber 73. And branch pipes or passages 80 communicate with and lead from the upper part of the upright central flue 75 to side passages or manifolds 81 which are, by preference, located on opposite sides of a plurality or set of such smoke-producing devices or burners 71. There are three of these smoke-producing devices 71 for each series of superposed treating chambers or vertical sections 10 of the apparatus shown in the drawings; and the flue 75 of the one nearest to the back wall 7 of the structure, is connected with an end manifold or passage 82 by means of a branch pipe 83 which leads into said manifold. The manifolds 82 are connected at their opposite ends with the side manifolds 81 located on opposite sides of the same smoke-producing burners 71. (See Figs. 2 and 10.)

The manifolds 81 and 82 are provided with damper-controlled connecting passages which connect them with upright passages or flues either formed by the upright hollow walls of the structure, or located outside of the structure. And I prefer to so construct and arrange the manifolds 81 and 82 that the gases and products of combustion passing from the burner chambers 77 through the upright flues 75 may be conducted either into the upright spaces within the hollow walls, in case it is found desirable to heat said walls or any one or more of such walls or portions thereof, or else diverted from the spaces within the hollow walls and conducted into outer chimneys, as will be more fully hereinafter described.

Each smoke-producing device or burner 71 is provided with a gas burner 84 which is located within the burner chamber 77 at the bottom of the flue 75. The gas burners 84 are thus each located at the bottom of or within a continuous passage 79 the lower extremity of which passage is formed by the burner chamber 77. The passage or space within the flue or pipe 75 and the walls of the gas burner chamber 77 may thus be said to be enlarged at its lower extremity so as to form the gas burner chamber 77 which is of greater diameter than the pipe or flue 75 and the part of the passage 79 which is located within the smoke-producing combustion chamber 73 which surrounds the flue. The continuous passage 79 thus extends upward through the center of the bottom opening 74 and through the center of the annular truncated-cone shaped smoke-producing combustion chamber 73. A part of the downwardly and outwardly inclined circular wall 76 of the gas-burner chamber,—which circular wall is within and spaced apart from the annular margin or perimeter of said opening 74,—is located above the annular opening 74 and within the combustion chamber 73, and is provided with a series of upwardly and outwardly inclined openings 85 through said inclined peripheral wall 76 within the smoke-producing combustion chamber. These inclined peripheral openings 85 lead from the gas-burner chamber 77 into the annular lower extremity of the truncated-cone shaped smoke-producing combustion chamber 73, and form connecting passages between said chambers which are adapted to admit and conduct jets of flame or burning gas emitted from adjacent peripheral upwardly and outwardly inclined gas passages 86 in the perforated top burner member 87 of the gas burner 84 into said combustion chamber 73 and in contact with combustible material, such as wood shavings or similar smoke-producing material in said chamber 73.

The gas burners 84, when constructed as shown in the accompanying drawings, each comprise a top burner member or perforated plate 87 and a bottom plate 88 which is secured to the bottom face of the said top burner member. The top burner member 87 is hollowed out so as to form an inner gas-supply chamber 89 having one or more gas-supply passages 90 leading to said annular inner gas-supply chamber and communicating with the interior of a gas-supply pipe 94, said chamber 89 having a series of upwardly and outwardly inclined peripheral gas-discharging passages or jets 86 each of which is, by preference, adjacent to and in position to discharge a jet of gas into and through a corresponding inclined peripheral connecting passage 85 leading through the inclined wall 76 of the gas burner chamber 77 and into the annular smoke-producing combustion chamber 73.

The top gas-burner member is, by preference, provided with a series of upwardly and outwardly inclined peripheral air-discharging passages 91 which are located between the gas-passages 86 and converge toward the center of the top burner member 87 where they are connected at their inner extremities with an air-supply pipe 92, which is in turn connected with an air-supply pipe 93 leading to a suitable source of supply of air under pressure. The air passages 91 are, by preference, bifurcated or divided at their outer extremities into two branch passages which are in angular relation to each other and each of which extends outward and upward at an angle in the direction of the discharge opening of the next adjacent gas-discharge passage 86 and is adapted to emit a jet of air toward and at an angle with respect to the jet of gas from such passage 86. The jet of air thus unites with the jet of gas within the burner chamber 77. All of the jets being ignited within said gas-burner chamber, the jets of flame are blown into the openings 85 and therethrough into contact with the combustible material in chamber 73.

The gas-supply passages 90 leading into the inner gas-supply chamber 89 from the interior of the gas-supply pipe 94, are connected with a suitable source of supply of liquid hydrocarbon or gas, by means of a supply pipe 95 with which any desired number of said gas-supply pipes 94 are connected, there being, by preference, one gas supply pipe 95 and one main air-supply pipe 93 for each set of smoke-producing devices or burners 71. (See Fig. 2.)

Each of the smoke-producing burners 71 may be provided with a heat-radiating drum 96 which is connected with the flue 75 by a connecting passage 97 which is controlled by a damper 98. And an ash-pit 99 is provided which is adapted to receive ashes and waste products of combustion which are permitted to pass from the interior of the smoke-producing combustion chamber 73 through the annular discharge opening 74 at the bottom of said chamber. (See Figs. 3 and 8.)

Each manifold 82 is located adjacent to the hollow back wall 7 of the structure and is connected at its opposite ends with the side manifolds 81 of the same section. And these connected manifolds are provided with damper-controlled openings for enabling the gases or products of combustion from the gas-burners 84 to be conducted either into the hollow spaces within the upright walls or into an outer chimney, as desired, as already suggested.

By reference to Figs. 2, 8, 9 and 10, it will be seen that each side manifold 81 has a plurality of damper-controlled openings 100 leading from such manifold into the inner space 101 within the adjacent upright hollow wall 6 or 11, as the case may be, the walls 6 being the end walls of the structure, and the walls 11 being the hollow partition walls between the sections 10.

Dampers 102, fixed to rock shafts 103 within the side manifolds 81, are mounted in position to open and close said openings 100.

Each end manifold 82, the opposite ends of which are connected with the side manifolds 81 of the same set of smoke-producing devices or burners 71, is provided with one or more damper-controlled outlet openings 104 leading from said manifold into the inner upright space or passage 105 within the adjacent back wall 7 of the structure; and one or more outlet openings 106 lead from the same end manifold 82 into a connecting passage 107 formed by an outer pipe 108 which leads upward and into an upright outer chimney or flue 109, adjacent to the back wall 7.

Dampers 110 are fixed to rock-shafts 111 rockingly mounted within the said end manifolds 82, in position to open and close the corresponding outlet openings 104 leading into the upright inner space 105 within the back wall 7; and similar dampers 112 are fixed to the same horizontal rock shafts 111 within said end manifolds 82, in position to open and close the adjacent openings 106 leading through said back wall through pipe 108 and to the outer chimney 109. The dampers 110 and 112 which are fixed to the same rock shaft 111, for operating them, are so disposed on the shaft and relatively to each other that when one is opened by the rocking of said shaft, the other damper will be closed, and vice versa. And the shafts 103 for operating the dampers 102 within the side manifolds 81 are so connected with the damper-operating shaft 111 for operating dampers 110 and 112 in the end manifold 82 of the same section, by means of bevel gear wheels 113 fixed to the rock shaft 111 and mating bevel gear wheels 114 on said shafts 103 that the rocking of the damper-operating shafts 103 and 111 in one direction will close the dampers 110 and 102 over the openings 102 and 104 leading to the spaces within the upright walls, and open the dampers 112 and the openings 106 leading to the outer chimney 109 through pipes 108, as shown in Figs. 8 and 10.

From the foregoing it will be readily understood that each floor has its damper-controlled passage 39 for affording communication and permitting and controlling the passage of prepared or smoke-laden air from compartment to compartment, at one end of such floor; and its inlet and outlet passages 21 and 23 for permitting the passage of air within the interior of such floor, are located at the opposite end of the same from said damper-controlled passage 39, the passages 39 of alternate floors—for example, floors 1 and 3—being directly over each other, and the passages 39 of the other alternate floors—for example, floors 2 and 4—being directly over each other. (See Figs. 1, 3, 6 and 7.)

I claim:

1. In an apparatus of the class described, the combination of a plurality of superposed treating chambers, an inlet passage leading into the lowermost chamber, an outlet passage leading from the upper part of an adjacent upper chamber, an intermediate connecting passage between said chambers, means associated with said inlet passage, for supplying gaseous fluid to the same, and means for opening and closing said passages in predetermined order.

2. In an apparatus of the class described, the combination of a plurality of superposed treating chambers, each of said chambers having an inlet passage located at the bottom and near one end thereof, and having an outlet passage at the top and near the opposite end of such chamber, the outlet passage of each chamber being connected with and forming a continuation of the inlet passage of the next adjacent upper chamber, and the inlet passage of each chamber being connected with and forming a continuation of the outlet passage of the next adjacent lower chamber, smoke-producing means associated with and adapted to supply smoke-laden air to the lowermost one of said inlet passages, and means for opening and closing said passages in predetermined order.

3. In an apparatus of the class described, the combination of a plurality of superposed treating chambers including a lowermost chamber, an upper chamber, and an intermediate chamber, a passage leading from said lowermost chamber into the lower part of said intermediate chamber and forming an inlet passage for the latter, an outlet passage leading from the upper part of said intermediate chamber into the next adjacent upper chamber and forming an inlet passage for the latter, an outlet passage leading from the upper chamber, smoke-producing means associated with and adapted to supply smoke to the interior of said lower chamber, passage-controlling doors for said passages respectively, and door-operating mechanism connected with said doors, and including means for automatically opening and closing said passage-controlling doors and passages in predetermined order, to control the movement of smoke into and through said chambers respectively.

4. In an apparatus of the class described, the combination of a series of superposed treating chambers, including a lower chamber, an upper chamber and an intermediate chamber, each of said chambers having an inlet passage located at the bottom and near one end thereof, and having an outlet passage at the top and near the opposite end of such chamber, the outlet passage of each chamber being connected with and forming a continuation of the inlet passage of the next adjacent upper chamber, and the inlet passage of each chamber being connected with and forming a continuation of the outlet passage of the next adjacent lower chamber, passage-controlling doors for all of said passages, a connecting rod operatively connected with and connecting all of said doors located near one end of said series of chambers, a second connecting rod operatively connected with and connecting all of said doors located near the opposite end of said series of chambers, and means for operating said connecting rods in predetermined order, for opening and closing the doors in the desired order.

5. In an apparatus of the class described, the combination of a structure having upright outer and inner walls forming a plurality of vertical sections, each of said sections comprising a plurality of superposed treating chambers having connecting passages, an inlet passage leading into the lower one of said chambers, an outlet passage leading from the upper one of said chambers, smoke-producing means associated with and adapted to supply smoke-laden air to the inlet passages of the lower treating chambers, passage-controlling doors for all of said passages, and door-operating mechanism including means for opening and closing said doors in predetermined order, for controlling the introduction of smoke-laden air into and the movement of the same through said chambers.

6. In an apparatus of the class described, the combination of a structure having upright outer and inner walls forming a plurality of vertical sections, each of said sections comprising a plurality of superposed treating chambers having connecting passages therebetween, an inlet passage leading into the lower one of the treating chambers of each section, respectively, an outlet passage leading from the upper one of the superposed chambers of each section respectively, smoke-producing means associated with and adapted to supply smoke-laden air to the inlet passages of the lower chamber of each section respectively, passage-controlling doors for all of said passages, and door-operating mechanism for and operatively connected with the passage-controlling doors of each section respectively, said door-operating mechanism including means for automatically opening and closing the passage-controlling doors of each section independently of the door-operating mechanism for operating the doors of the other sections respectively.

7. In an apparatus of the class described, the combination of a receptacle provided with a smoke-producing combustion chamber having a smoke-discharging opening, and provided with a lower opening, a burner located adjacent to said lower opening and adapted to cause the ignition of combustible material contained in said combustion chamber near said lower opening, a perforated hollow casing member surrounding said burner and extending between the burner and the open bottom portion of said smoke-producing combustion chamber, and a flue forming a discharge passage leading upward from said burner and from the interior of said casing, and adapted to conduct heated gases away from the burner and said casing.

8. In an apparatus of the class described, the combination of a receptacle forming a smoke-producing combustion chamber having an upper smoke-outlet, and provided with a lower opening, a burner located adjacent to said lower opening and adapted to cause the ignition of combustible material contained in said chamber near said opening, means for supplying fuel to said burner, and a flue having an enlarged perforated bottom casing portion surrounding said burner and forming a burner chamber, said flue and perforated casing forming a passage leading upward from said lower opening in the combustion chamber and from said burner, and adapted to conduct heated gases away from the burner separately from the smoke produced in the smoke-producing combustion chamber.

9. In an apparatus of the class described, the combination of a receptacle forming a smoke-producing combustion chamber having an upper smoke-outlet, and provided with a lower opening leading from the bottom of said combustion chamber, a burner located adjacent to said lower opening and adapted to cause the ignition of combustible material contained in said chamber near said opening, means for supplying fuel to said burner, a flue having a lower perforated casing portion surrounding said burner and extending between the burner and the margin of the said lower opening in the bottom of said combustion chamber, and a treating chamber associated with said smoke-producing combustion chamber and adapted to receive smoke from the latter, for treating material within the treating chamber.

Signed at Chicago, in the county of Cook and State of Illinois, this 2nd day of June, 1928.

ALBERT P. D. BELANGER.